United States Patent
Ge

(10) Patent No.: US 11,693,544 B2
(45) Date of Patent: Jul. 4, 2023

(54) MOBILE TERMINAL DISPLAY PICTURE CONTROL METHOD, APPARATUS, AND DEVICE AND STORAGE MEDIUM

(71) Applicant: NETEASE (HANGZHOU) NETWORK CO., LTD., Zhejiang (CN)

(72) Inventor: Jin Ge, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/439,803

(22) PCT Filed: Jan. 14, 2020

(86) PCT No.: PCT/CN2020/072015
§ 371 (c)(1),
(2) Date: Sep. 15, 2021

(87) PCT Pub. No.: WO2020/199723
PCT Pub. Date: Oct. 8, 2020

(65) Prior Publication Data
US 2022/0179545 A1  Jun. 9, 2022

(30) Foreign Application Priority Data

Mar. 29, 2019  (CN) .......................... 201910252885.7

(51) Int. Cl.
*G06F 3/04845* (2022.01)
*G06F 3/04883* (2022.01)

(52) U.S. Cl.
CPC ...... *G06F 3/04845* (2013.01); *G06F 3/04883* (2013.01); *G06F 2203/04806* (2013.01); *G06F 2203/04808* (2013.01)

(58) Field of Classification Search
CPC ....... G06F 2203/04808; G06F 3/04883; G06F 1/1643; G06F 1/1647; G06F 2203/04104;
(Continued)

(56) References Cited

U.S. PATENT DOCUMENTS

2007/0033544 A1* 2/2007 Fleisher ................ G06F 3/0481
382/311
2011/0080430 A1* 4/2011 Nishibe ................ G06F 3/0485
345/173
(Continued)

FOREIGN PATENT DOCUMENTS

CN   103019594 A   4/2013
CN   105242841 A   1/2016
(Continued)

OTHER PUBLICATIONS

The International Search Report dated Apr. 13, 2020 for PCT international application No. PCT/CN2020/072015.
(Continued)

*Primary Examiner* — Rayeez R Chowdhury
(74) *Attorney, Agent, or Firm* — Qinghong Xu

(57) ABSTRACT

Provided is a method, device, apparatus for controlling a display picture of a mobile terminal, and a storage medium. The mobile terminal includes a touch screen and a touch panel. The first touch operation imposed on the first preset area of the touch screen and the second touch operation imposed on the second preset area of the touch panel are determined, and whether the first touch operation and the second touch operation meet the preset zoom condition is determined, and if so, the zoom control is performed on the display picture in the third preset area of the touch screen.

20 Claims, 6 Drawing Sheets

(58) Field of Classification Search
CPC ........... G06F 2203/04105; G06F 3/013; G06F
3/016; G06F 3/041; G06F 3/0412; G06F
3/0414; G06F 3/0416; G06F 3/044; G06F
3/045; G06F 3/048; G06F 3/04815; G06F
3/04817; G06F 3/0482; G06F 3/04845;
G06F 3/04886; G06F 9/4843; G06F
21/316; G06F 21/32; G06F 3/04847;
G06F 2203/04107; G06F 3/0425; G06F
3/047; G06F 3/038; G06F 3/0484; G06F
40/18; G06F 2203/0383; G06F
2203/0384; G06F 2203/04101; G06F
2203/04809; G06F 3/041661; G06F
3/0443; G06F 3/0446; G06F 3/0448;
G06F 3/04855; G06F 16/23; G06F
16/9024; G06F 16/904; G06F
2203/04805; G06F 3/0483
See application file for complete search history.

(56) References Cited

U.S. PATENT DOCUMENTS

| | | | | |
|---|---|---|---|---|
| 2011/0109563 | A1* | 5/2011 | Liu | G06F 3/0416 345/173 |
| 2012/0001944 | A1* | 1/2012 | Sakurai | G06F 3/04815 345/671 |
| 2013/0033448 | A1* | 2/2013 | Yano | G06F 3/018 345/173 |
| 2014/0028729 | A1* | 1/2014 | Abdukalykov | G06F 3/04883 345/661 |
| 2014/0059501 | A1* | 2/2014 | Yuu | G06F 3/04883 715/863 |
| 2014/0168139 | A1* | 6/2014 | Ku | G06F 3/04845 345/174 |
| 2014/0184510 | A1* | 7/2014 | Jeong | G06F 3/041 345/163 |
| 2014/0191986 | A1* | 7/2014 | Kim | G06F 3/04817 345/173 |
| 2014/0267115 | A1* | 9/2014 | Jeon | G06F 3/041 345/173 |
| 2014/0368260 | A1* | 12/2014 | Tanada | G06F 3/04883 327/517 |
| 2014/0375596 | A1* | 12/2014 | Kim | G06F 1/1652 345/173 |
| 2015/0097755 | A1* | 4/2015 | Kim | G06F 3/1446 345/1.3 |
| 2016/0291731 | A1* | 10/2016 | Liu | G06F 3/04842 |

FOREIGN PATENT DOCUMENTS

| | | |
|---|---|---|
| CN | 106354287 A | 1/2017 |
| CN | 106681647 A | 5/2017 |
| CN | 107391000 A | 11/2017 |
| CN | 108958615 A | 12/2018 |
| CN | 110032326 A | 7/2019 |

OTHER PUBLICATIONS

The 1st Office Action dated Dec. 2, 2019 for CN patent application No. 201910252885.7.

* cited by examiner

L2:second sliding distance

MOBILE TERMINAL DISPLAY PICTURE CONTROL METHOD, APPARATUS, AND DEVICE AND STORAGE MEDIUM

CROSS-REFERENCE TO RELATED APPLICATIONS

The present application is the 371 application of PCT Application No. PCT/CN2020/072015, filed on Jan. 14, 2020, which is based on and claims priority to Chinese Patent Application No. 201910252885.7, filed on Mar. 29, 2019, the entire contents of both of which are incorporated herein by reference.

TECHNICAL FIELD

The present disclosure relates to the field of mobile terminal technologies, and in particular, to a method, device, apparatus for controlling a display picture of a mobile terminal and a storage medium.

BACKGROUND

In different applications of a mobile terminal (such as a smartphone, a tablet, etc.), a user can perform zoom control on a display picture, such as a game screen, a map, an image, and a document screen, in an application according to actual needs. Gestures for screen zooming in different applications may be same or different, and can be preset by the user.

Herein, a game screen is taken as an example. There are mainly two operation methods for zooming the game screen in the related art. One of the operation methods is zooming the game screen with single-finger operations. As an example, a screen zooming at any position of the screen is achieved by double clicking the position. As another example, an overall zooming of the screen is achieved by clicking a zooming control (a zooming button or a zooming slider, etc.) in the game screen. The other one of the operation methods is zooming the game screen with two-finger operations. The latter is the current mainstream operation scheme.

It should be noted that the information disclosed in the Background section above is only for enhancing the understanding of the background of the present disclosure, and thus may include information that does not constitute related art known to those skilled in the art.

SUMMARY

The present disclosure provides a method, device, apparatus for controlling a display picture of a mobile terminal and a storage medium.

A first aspect of the present disclosure provides a method for controlling a display picture of a mobile terminal. The mobile terminal includes a touch screen and a touch panel, and the method includes:

obtaining a first touch operation imposed on a first preset area of the touch screen, and a second touch operation imposed on a second preset area of the touch panel; and performing zoom control on a display picture in a third preset area of the touch screen in response to determining that the first touch operation and the second touch operation meet a preset zoom condition.

A second aspect of the present disclosure provides an electronic device, including: a touch screen, a touch panel, a processor, and a memory;

the memory stores computer executable instructions;

The processor executes the computer executable instructions stored in the memory, so that the processor executes the method according to any one of the first aspect of the present disclosure.

A third aspect of the present disclosure provides a non-transitory computer-readable storage medium on which a computer program is stored, which, when executed by a processor, implements the method of any one of the first aspect of the present disclosure.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without paying creative labor.

DETAILED DESCRIPTION

To make objectives, technical solutions, and advantages of embodiments of the present disclosure more clear, the technical solutions in the embodiments of the present disclosure will be described below in conjunction with the drawings in the embodiments of the present disclosure. Apparently, the described embodiments are part of the embodiments of the present disclosure, and are not all thereof. Based on the embodiments in the present disclosure, all other embodiments obtained by those skilled in the art without making creative efforts fall within the protection scope of the present disclosure.

The terms "first", "second", etc. in the specification and claims of the present disclosure and the above-mentioned drawings are used for distinguishing similar objects, and do not have to be used for describing a specific order or sequence. It should be understood that the data used in this way are interchangeable under appropriate circumstances so that the embodiments of the present disclosure described herein can be implemented in an order other than those illustrated or described herein.

It should be understood that the terms "including" and "having" and any variations thereof are intended to cover non-exclusive inclusions, for example, processes, methods, systems, products or devices that contain a series of steps or units need not be limited to those clearly listed steps or units, but may include other steps or units not explicitly listed or inherent to these processes, methods, products, or devices.

At present, to achieve the zoom control of a display picture of a mobile terminal, a single-finger operation or a single-screen two-finger operation is mainly used in the existing zoom control. The existing technical solutions are briefly introduced below by taking a game screen as an example.

Figure 1A:
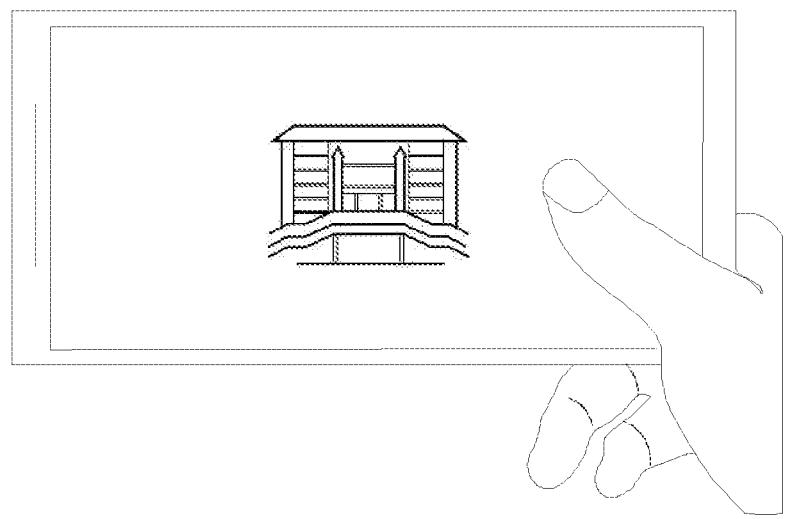
FIG. 1A is a schematic diagram illustrating a player holding a mobile terminal in a game screen.
Figure 1B:
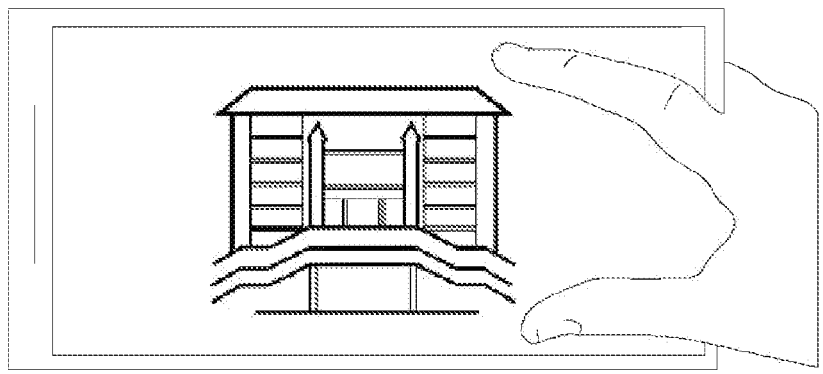
FIG. 1B is a schematic diagram illustrating a player performing zoom control on a game screen with two fingers in a solution of the related art.

FIG. 1A is a schematic diagram illustrating a player holding a mobile terminal in a game screen, and FIG. 1B is a schematic diagram illustrating a player performing zoom control on a game screen with two fingers.

The single-finger operation includes the following three implementations:

In a possible implementation, a user double-clicks any position of the game screen on a touch screen of the mobile terminal, and zooms the picture at a fixed ratio with the point being double clicked as a center.

In another possible implementation, a picture zoom slider is provided in a lower right corner of the game screen, so that the user may drag the slider to achieve free zooming centered on a position of a virtual character in the game screen, and a zoom ratio is controlled by the user.

In still another possible implementation, an add/subtract button for picture zooming is provided on the lower right corner of the game screen, so that the user may click the add/subtract button to achieve a free zooming centered on the position of the virtual character in the game screen, and the zoom ratio is controlled by the user.

The single-screen two-finger operation means that the user performs dragging in the game screen with two fingers such as the thumb and index finger to achieve free picture zooming with average coordinates of the two fingers as the center, and the zoom ratio is controlled by the user. As shown in FIG. 1B, two fingers are above the touch screen of the mobile terminal.

The zoom ratio for the display picture cannot be freely controlled in the first implementation. The zoom position of the display picture cannot be freely controlled in the second and third implementations. Although the zoom ratio and zoom position can be freely controlled in the fourth implementation which is the most commonly used operation scheme at present. The most comfortable operation gesture during a game application is that the thumbs of both hands are above the touch screen of the mobile terminal, and the rest of the fingers are below the touch screen, as shown in FIG. 1A. However, in the fourth implementation, the user is required to perform the zoom operation with the cooperation of the right thumb and the right index finger by moving the right index finger over the mobile terminal to be above the touch screen, as shown in FIG. TB. Such action takes time, which may cause operation delay and affect the game effect. From the perspective of ergonomics, such zoom gesture is not comfortable and natural.

It can be seen that the existing technical solutions have their own advantages and disadvantages. The single-screen two-finger operation meets the free control of zoom ratio and zoom position, but from the perspective of ergonomics, the gesture of zoom operation is not comfortable enough. In view of the above technical problems, embodiments of the present disclosure provide a method for controlling a display picture of a mobile terminal, which realizes zoom control on the display picture based on a dual-screen two-finger operation. The zoom gesture is convenient and quick, thereby improving the user's control experience on the picture. This solution can be applied to various types of electronic devices, including terminals such as tablets, smartphones, and smart game consoles, or can be applied to a back-end server for application software/clients, etc. which is not In particular limited by the solution.

The method for controlling the display picture of the mobile terminal will be described in detail below in conjunction with several specific embodiments.

Figure 2:
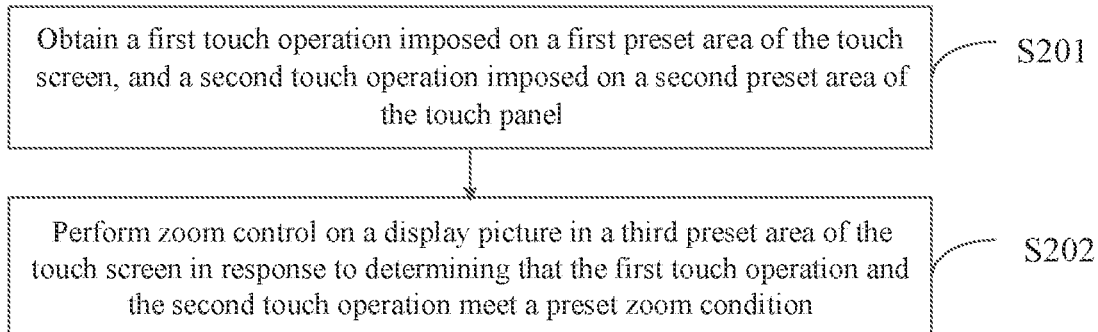
FIG. 2 is a schematic flowchart of a method for controlling a display picture of a mobile terminal according to an embodiment of the present disclosure.

FIG. 2 is a schematic flowchart of a method for controlling a display picture of a mobile terminal provided by an embodiment of the present disclosure. The display picture is obtained by running a software application with a processor of the mobile terminal and performing rendering on a display of the mobile terminal, and the display picture may be a game screen, a map picture, a web page picture, an image, a document, etc., which is not In particular limited by this embodiment.

The mobile terminal of the embodiment is a double-sided screen mobile terminal or a folding screen mobile terminal, which is not In particular limited in this embodiment. The mobile terminal includes a touch screen and a touch panel. It can be understood that in the case that the mobile terminal is the double-sided screen mobile terminal, the touch screen is a front touch screen configured to display a user interface, the touch panel is a rear touch screen configured to collect user finger operations, and the rear touch screen does not have a function of displaying the user interface. In the case that the mobile terminal is a folding mobile terminal, both the touch screen and the touch panel have the function of displaying the user interface. It should be noted that, as for the folding screen mobile terminal, the method for controlling the display picture of the mobile terminal provided in this embodiment is used when the folding screen mobile terminal in a folded state.

As shown in FIG. 2, the method for controlling the display picture of the mobile terminal provided in this embodiment In particular includes steps described below.

In S201, a first touch operation imposed on a first preset area of the touch screen, and a second touch operation imposed on a second preset area of the touch panel are obtained.

In S202, in response to determining that the first touch operation and the second touch operation meet a preset zoom condition, zoom control is performed on a display picture in a third preset area of the touch screen.

In this solution, it should be understood that a display of an execution subject performs rendering according, to application software currently executed by the processor to obtain the display picture of the application. The user performs the zoom control on the display picture in the third preset area of the current touch screen by the touch operations on the touch screen and the touch panel. For example, the currently run application software is game software and the display picture is the game screen accordingly, and the user realizes the zoom control on the game screen by the touch operations on the touch screen and the touch panel.

In a specific implementation of the solution, the first touch operation refers to an operation performed by the user on a first preset area of the touch screen. For example, an electronic device running the application will obtain the first touch operation if the user presses and slides on the first preset area of the touch screen. The second touch operation refers to an operation performed by the user on a second preset area of the touch panel. For example, the electronic device running the application will obtain the second touch operation if the user presses and slides on the second preset area of the touch panel. Then, the zoom control on the display picture in the third preset area of the touch screen is realized according to the first touch operation and the second touch operation.

It should be noted that, in this embodiment, the touch screen and the touch panel are two parallel screens in physical space. The first preset area of the touch screen is a detection area in the front touch screen of the mobile terminal used for detecting the user's touch operation. The second preset area of the touch panel is a detection area in the rear touch screen of the mobile terminal used for detecting the user's touch operation. The third preset area of the touch screen is a user interface display area in the front touch screen of the mobile terminal. A size of the first preset area and a size of the second preset area are equal, and a projection of the first preset area on the touch panel overlaps with the second preset area. The first preset area is smaller than or equal to the third preset area. In this solution, in response to determining that the first touch operation and the second touch operation meet a preset zoom condition, a zoom function for the display picture is enabled, where the preset zoom condition includes conditions for touching and sliding. Then, a zoom position and a zoom ratio for the display picture are determined according to the sliding information of the first touch operation and the second touch operation, so that the zoom control is performed on the display picture in the third preset area of the touch screen according to the zoom ratio with the zoom position as the center.

According to the method for controlling the display picture of the mobile terminal provided in this embodiment, the mobile terminal includes the touch screen and the touch panel, the first touch operation imposed on the first preset area of the touch screen and the second touch operation imposed on the second preset area of the touch panel are obtained, so as to determine whether the first touch operation and the second touch operation meet the preset zoom condition, and the zoom control is performed on the display picture in the third preset area of the touch screen if the preset zoom condition is met. The zoom control does not affect the user's current holding state of the mobile terminal, and the zoom control is performed according to the touch operations on the front and rear screens, thereby avoiding the delay caused by the existing single-screen two-finger operation, and improving the user's operating experience.

Based on the above embodiment, in this solution, the first touch operation and the second touch operation include a click operation and a sliding operation, where the click operation and the sliding operation are continuous operations, and the electronic device performs the zoom control on the display picture in the third preset area of the touch screen according to the user's click operation and sliding operation on the front and rear touch screens. A specific embodiment is described below.

Figure 3:
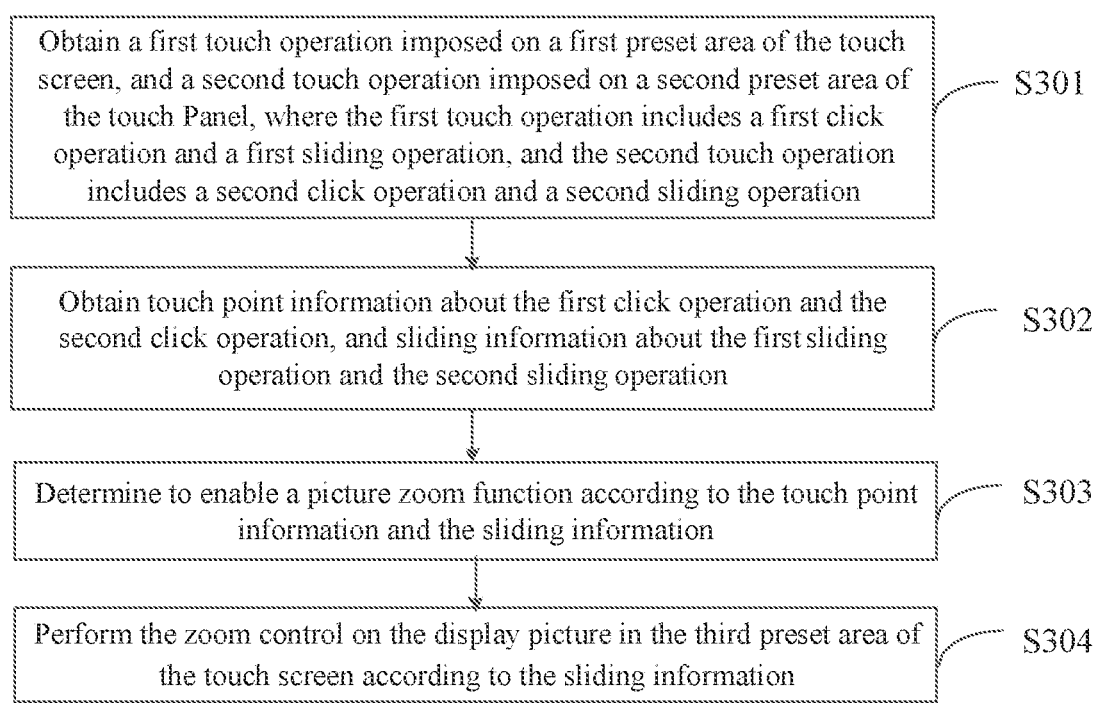
FIG. 3 is a schematic flowchart of a method for controlling a display picture of a mobile terminal according to another embodiment of the present disclosure.

FIG. 3 is a schematic flowchart of a method for controlling a display picture of a mobile terminal according to another embodiment of the present disclosure. As shown in FIG. 3, the method for controlling the display picture of the mobile terminal in this embodiment includes steps described below.

In S301, a first touch operation imposed on a first preset area of the touch screen, and a second touch operation imposed on a second preset area of the touch panel are obtained, where the first touch operation includes a first click operation and a first sliding operation, and the second touch operation includes a second click operation and a second sliding operation.

In S302, touch point information about the first click operation and the second click operation, and sliding information about the first sliding operation and the second sliding operation are obtained.

In S303, a picture zoom function is determined to be enabled according to the touch point information and the sliding information.

In S304, the zoom control is performed on the display picture in the third preset area of the touch screen according to the sliding information.

In the above steps, the user performs the first touch operation on the first preset area of the touch screen and the second touch operation on the second preset area of the touch panel, and then the electronic device detects the first click operation on the touch screen and the second click operation on the touch panel, and obtains the touch point information about the first click operation and the second click operation, where the touch point information includes at least one of a trigger time, a touch point location and a pressing force at the touch point; thereafter, the electronic device detects the first sliding operation on the touch screen and the second sliding operation on the touch panel, and obtains the sliding information about the first sliding operation and the second sliding operation, where the sliding information includes at least one of a sliding direction, coordinates of a starting point and an ending point of the sliding; the electronic device determines whether to enable the picture zoom function according to the touch point information and the sliding information of the first touch operation and the second touch operation. If it is determined to enable the picture ZOOM function, the zoom control is performed on the display picture in the third preset area of the touch screen according to the sliding information of the first touch operation and the second touch operation. Optionally, the first sliding operation is continuous with the first click operation, and the second sliding operation is continuous with the second click operation.

Hereinafter, a process in which the electronic device determines whether to enable the picture zoom function according to the touch point information and the sliding information is described in detail in conjunction with specific touch point information and sliding information.

In a possible implementation, the touch point information corresponding to the first click operation and the second click operation includes the trigger time and the touch point position. The trigger time refers to a time when the user's click action occurs, and the touch point position refers to a coordinate position of the touch point of the user's click action on the touch screen. The sliding information corresponding to the first sliding operation and the second sliding operation includes a sliding direction, and the sliding direction may be any direction centering on a starting point of the sliding. After obtaining the above-mentioned touch point information and sliding information of the first touch operation and the second touch operation, the electronic device determines whether to enable the picture zoom function according to the trigger time and the touch point position in the touch point information, and the sliding direction in the sliding information.

In particular, the electronic device determines to enable the picture zoom-in function h operations below:

determining to enable the picture zoom-in function if the followings are met: a time difference between a first trigger time of the first click operation and a second trigger time of the second click operation being less than a preset time difference; a distance between a first touch point position of the first click operation and a second touch point position of the second click operation being less than a first preset distance; and a sliding direction of the first sliding operation and a sliding direction of the second sliding operation are divergence directions.

Figure 4:
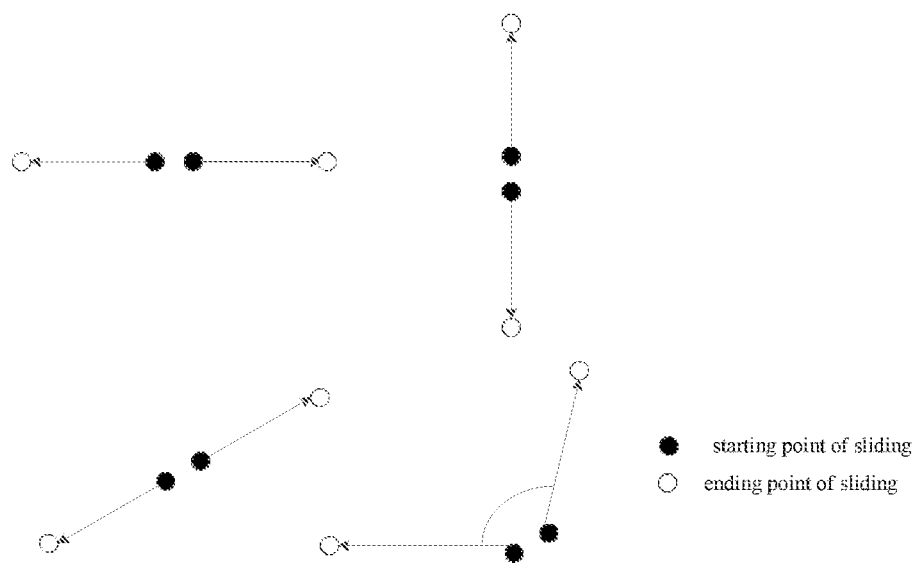
FIG. 4 is a schematic diagram illustrating a sliding in a divergence direction in an embodiment of the present disclosure.

FIG. 4 is a schematic diagram illustrating a sliding in a divergence direction in an embodiment of the present disclosure. The divergence direction refers to a direction in which a difference between positions of the sliding point of the first sliding operation in the first preset area and the sliding point of the second sliding operation in the second preset area continuously increases, that is to say, the distance between the sliding points is increasingly larger. As shown in FIG. 4, several different divergence directions are shown.

Figure 5:
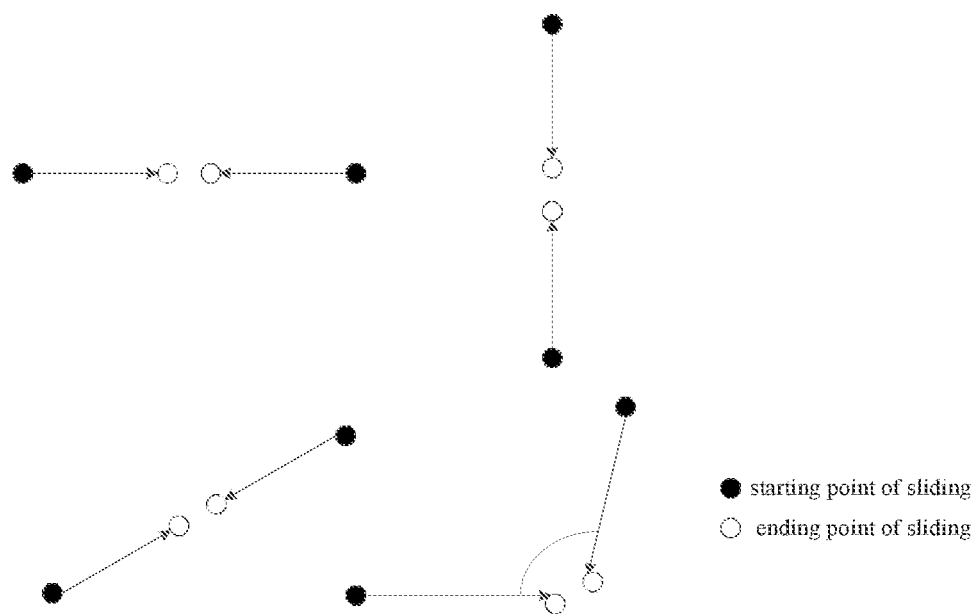
FIG. 5 is a schematic diagram illustrating a sliding in a convergence direction in an embodiment of the present disclosure.

In particular, the electronic device determines to enable the picture zoom-out function by operations below:

determining to enable the picture zoom-out function if the followings are met: a time difference between a first trigger time of the first click operation and a second trigger time of the second click operation being less than a preset time difference; a distance between a first touch point position of the first click operation and a second touch point position of the second click operation being greater than or equal to a second preset distance; and the first sliding operation and the second sliding operation being in a convergence direction, FIG. 5 is a schematic diagram illustrating a sliding in a convergence direction in an embodiment of the present disclosure. The convergence direction refers to a direction in which a difference between positions of the sliding point of the first sliding operation in the first preset area and the sliding point of the second sliding operation in the second preset area continuously decreases, that is to say, the distance between the sliding points is increasingly smaller. As shown in FIG. 5, several different convergence directions are shown.

In this implementation, based on the user's click and sliding operations on the touch screen and the touch panel, the electronic device determines whether the trigger times of a front touch point and a rear touch point are the same time, a distance between the front touch point and the rear touch point meets a preset distance range and the sliding direction of the sliding operation is divergent or convergent respectively, so as to determine whether to enable the zoom function on the display picture of the mobile terminal.

In another possible implementation, the touch point information about the first click operation and the second click operation includes the trigger time, the trigger position, and the pressing force at the touch point. The trigger time refers to a time when the user's click action occurs, the touch point position refers to a coordinate position of the touch point of the user's click action on the touch screen, and the pressing force refers to a pressing force corresponding to the click operation. The sliding information about the first sliding operation and the second sliding operation is the same as the above implementation, including the sliding direction, and the sliding direction may be any direction centering on a starting point of the sliding. After obtaining the above-mentioned touch point information and sliding information of the first touch operation and the second touch operation, the electronic device determines whether to enable the picture zoom function according to the trigger time, the touch point position, and the pressing force at the touch point included in the touch point information, as well as the sliding direction included in the sliding information.

In particular, the electronic device determines to enable the picture zoom-in function by operations below:

determining to enable the picture zoom-in function if the followings are met: the time difference between the first trigger time of the first click operation and the second trigger time of the second click operation being less than a preset time difference; a distance between a first touch point position of the first click operation and a second touch point position of the second click operation being less than a first preset distance; a pressing force of the first click operation and a pressing force of the second click operation both being greater than a preset pressure value; and the sliding direction of the first sliding operation and the sliding direction of the second sliding operation being divergence directions.

The divergence direction is same as the above-mentioned implementation, and can refer to FIG. 4 for details, which will not be repeated here.

In particular, it is determined to enable the picture zoom-out function if the followings are met:

the time difference between the first trigger time of the first click operation and the second trigger time of the second click operation being less than a preset time difference;

the distance between the first touch point position of the first click operation and the second touch point position of the second click operation being greater than a second preset distance;

the pressing force of the first click operation and the pressing force of the second click operation both being greater than a preset pressure value, and, the sliding direction of the first sliding operation and the sliding direction of the second sliding operation being convergence directions.

The convergence direction is the same as the above-mentioned implementation, and please refer to FIG. 5, which will not be repeated here.

In this implementation, besides determining the trigger time of the user's touch points on the front and rear touch screens, the distance between the touch points, and the sliding direction of the sliding operation, the electronic device also detects the pressing force of the touch points on the front and rear touch screens. The electronic device needs to determine whether the trigger times of the front touch point and the rear touch point are the same time, a distance between the front touch point and the rear touch point meets the preset distance range, the sliding direction of the sliding operation is divergent or convergent, and the pressing force meets the preset pressure value, respectively, so as to determine whether to enable the zoom function on the display picture of the mobile terminal. This implementation further detects the pressing force of the user's touch operation, so as to avoid enabling the picture zoom function due to the user's maloperations.

In this solution, after determining to enable the picture zoom function, the electronic device further performing operations of: determining a zoom parameter according to the sliding information about the sliding operation in the touch operation, and performing the ZOOM control on the display picture in the third preset area of the touch screen according to the zoom parameter.

In a case where the picture zoom function is enabled by the electronic device, the electronic device obtains the sliding information about the user's first sliding operation on the touch screen and the sliding information about the second sliding operation on the touch panel. The sliding information further includes: coordinates of a starting point and an ending point of the sliding. How to determine zoom parameters for the picture is described below in combination with two specific embodiments.

Figure 6:
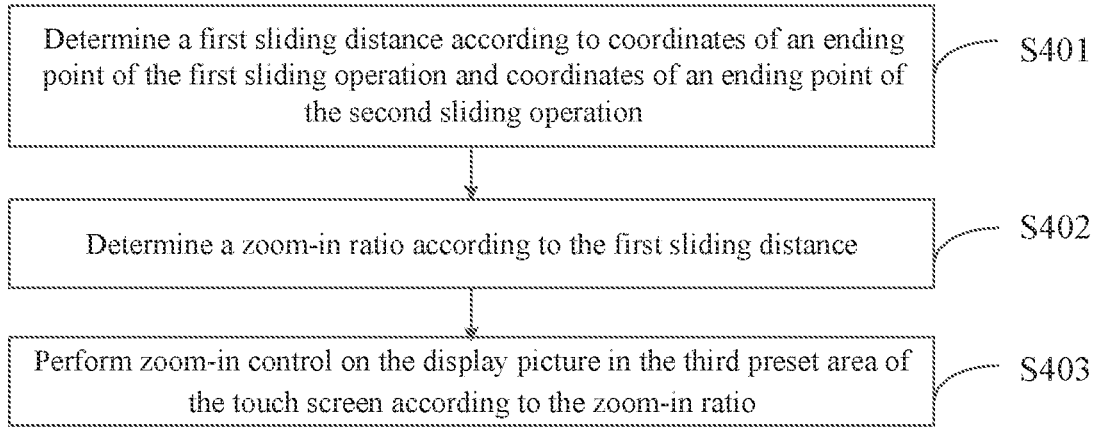
FIG. 6 is a schematic flowchart illustrating a picture zoom-in control provided by an embodiment of the present disclosure.
Figure 7:
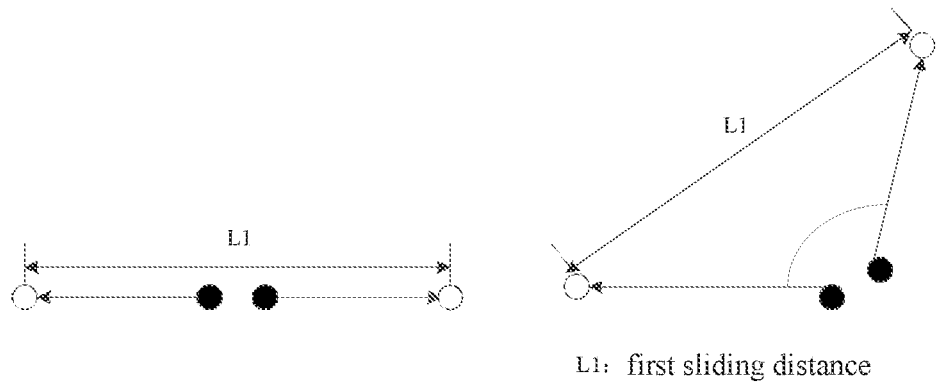
FIG. 7 is a schematic diagram illustrating a first sliding distance corresponding to a sliding operation.

FIG. 6 is a schematic flowchart of a picture zoom-in control provided by an embodiment of the present disclosure, and FIG. 7 is a schematic diagram illustrating a first sliding distance corresponding to a sliding operation.

As shown in FIG. 6, after enabling the picture zoom-in function, the electronic device performs the zoom-in control on the display picture in the third preset area of the touch screen according to the sliding information through the following steps.

In S401, a first sliding distance is determined according to coordinates of an ending point of the first sliding operation and coordinates of an ending point of the second sliding operation.

In S402, a zoom-in ratio is determined according to the first sliding distance.

In S403, zoom-in control is performed on the display picture in the third preset area of the touch screen according to the zoom-in ratio.

Since the sizes of the first preset area and the second preset area are equal, and the projection of the first preset area on the touch panel overlaps with the second preset area, it can be understood that the plane coordinate systems of the first preset area and the second preset area coincide. For example, the coordinate origin of the plane coordinate system of the first preset area is the upper left corner of the first preset area, and correspondingly, the coordinate origin of the plane coordinate system of the second preset area is the upper left corner of the second preset area.

The first sliding distance is the distance between the ending point of the first sliding operation and the ending point of the second sliding operation, see FIG. 7. If the sliding direction of the first sliding operation and the sliding direction of the second sliding operation are reverse, the first sliding distance is the sum of the sliding distances of the first sliding operation and the second sliding operation. If there is an angle between the sliding directions of the first sliding operation and the second sliding operation, and the first sliding distance is smaller than the sum of the sliding distances of the first sliding operation and the second sliding operation. It can be seen that regardless of whether the sliding direction of the first sliding operation and that of the second sliding operation are reverse, or there is an angle between the reverse sliding directions of the first sliding operation and the second sliding operation, the first sliding distance is a distance between the ending point of the first sliding operation and the ending point of the second sliding operation.

The electronic device determines the zoom-in ratio corresponding to the first sliding distance according to the determined first sliding distance, and performs the zoom-in control on the display picture in the third preset area of the touch screen according to the determined zoom-in ratio by taking a center point of the starting point of the first sliding operation and the starting point of the second sliding operation as the zoom-in point. It can be understood that the user can change the touch point position of the click operation and the sliding distance of the sliding operation on the front and rear touch screens according to actual needs, so as to control the zoom-in position and the zoom-in ratio for the display picture freely.

Figure 8:
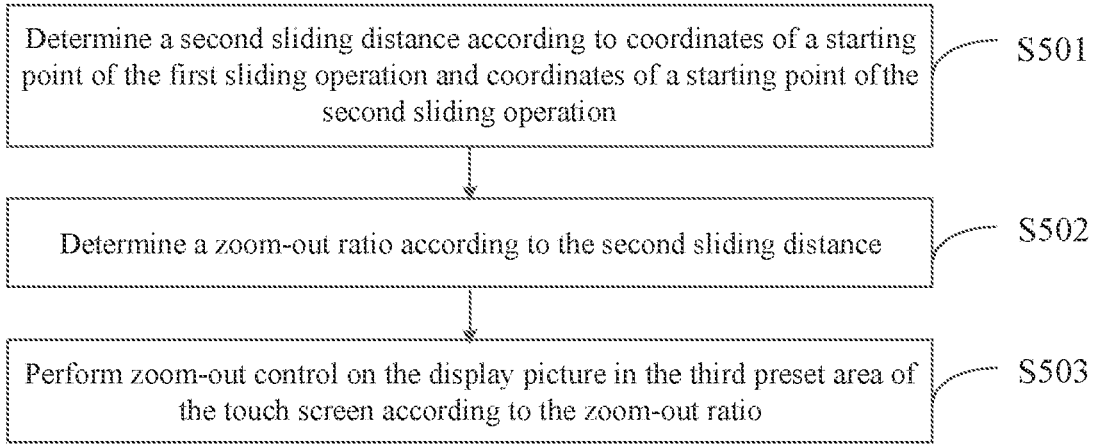
FIG. 8 is a schematic flowchart illustrating a picture zoom-out control provided by an embodiment of the present disclosure.
Figure 9:
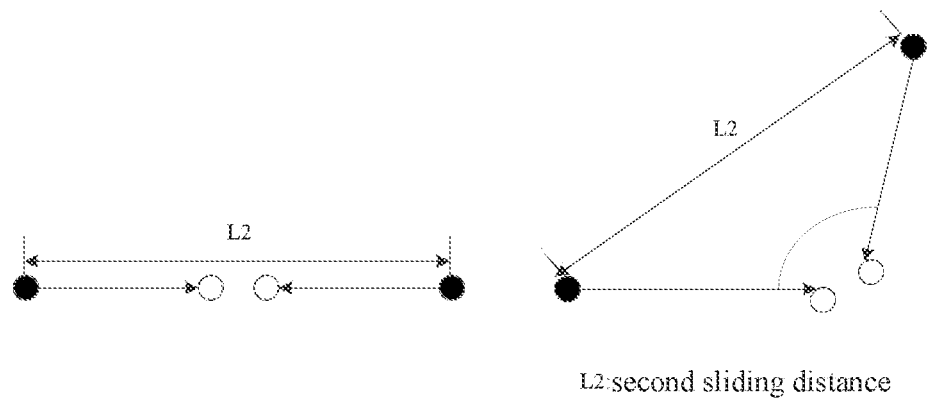
FIG. 9 is a schematic diagram illustrating a second sliding distance corresponding to a sliding operation.

FIG. 8 is a schematic flowchart of a picture zoom-out control provided by an embodiment of the present disclosure, and FIG. 9 is a schematic diagram illustrating a second sliding distance corresponding to the sliding operation.

As shown in FIG. 8, after enabling the picture zoom-out function, the electronic device performs the zoom-out control on the display picture in the third preset area of the touch screen according to the sliding information through the following steps.

In S501, a second sliding distance is determined according to coordinates of a starting point of the first sliding operation and coordinates of a starting point of the second sliding operation.

In S502, a zoom-out ratio is determined according to the second sliding distance.

In S503, zoom-out control is performed on the display picture in the third preset area of the touch screen according to the zoom-out ratio.

It should be noted that the first sliding operation and the first click operation are continuous operations, and the second sliding operation and the second click operation are continuous operations. Therefore, the coordinates of the starting point of the first sliding operation and the coordinates of a first touch point of the first click operation are the same, and the coordinates of the starting point of the second sliding operation and the coordinates of a second touch point of the second click operation are the same.

In this embodiment, the second sliding distance is the distance between the starting point of the first sliding operation and the starting point of the second sliding operation, see FIG. 9. If the sliding direction of the first sliding operation and the sliding direction of the second sliding operation are the same, the second sliding distance is the sum of the sliding distance of the first sliding operation and the sliding distance of the second sliding operation. If there is an angle between the sliding direction of the first sliding operation and the sliding distance of the second sliding operation, and the second sliding distance is smaller than the sum of the sliding distance of the first sliding operation and the sliding distance of the second sliding operation. It can be seen that regardless of whether the sliding direction of the first sliding operation and that of the second sliding operation are the same, or there is an angle between the same sliding directions of the first sliding operation and the second sliding operation, the second sliding distance is the distance between the starting point of the first sliding operation and the starting point of the second sliding operation.

The electronic device determines the zoom-out ratio corresponding to the second sliding distance according to the determined second sliding distance, and performs the zoom-out control on the display picture in the third preset area of the touch screen according to the determined zoom-out ratio by taking the center point of the starting point of the first sliding operation and the starting point of the second sliding operation as the zoom-out point. It can be understood that the user can change the touch point position of the click operation and the sliding distance of the sliding operation on the front and rear touch screens according to actual needs, and control the zoom-out position and the zoom-out ratio for the display picture freely.

According to the method for controlling the display picture of the mobile terminal provided in this embodiment, the mobile terminal includes the touch screen and the touch panel, the touch point information and sliding information about the first touch operation imposed on the first preset area of the touch screen, and the touch point information and sliding information about the second touch operation imposed on the second preset area of the touch panel are obtained, it is determined whether to enable the zoom function for the display picture according to the touch point information and the sliding information about the first touch operation and the second touch operation. If it is determined to enable the zoom function, the zoom point position and zoom parameters are further determined according to the sliding information of the first touch operation and the second touch operation, and the zoom control is performed on the display picture in the third preset area of the touch screen according to the zoom parameter with the zoom point position as the center. The above zoom control does not affect the user's current holding state of the mobile terminal, and the zoom control is performed according to the touch operations of the front and rear screens, avoiding the delay caused by the existing single-screen two-finger operation, and improving the user's operating experience.

Figure 10:
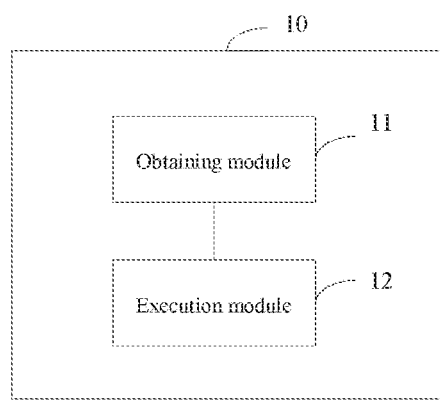
FIG. 10 is a schematic structural diagram illustrating a device for controlling a display picture of a mobile terminal according to an embodiment of the present disclosure.

FIG. 10 is a schematic structural diagram illustrating a device for controlling a display picture of a mobile terminal according to an embodiment of the present disclosure. As shown in FIG. 10, the device 10 for controlling the display picture of the mobile terminal includes an obtaining module 11 and an execution module 12.

The obtaining module 11 is configured to obtain a first touch operation imposed on a first preset area of a touch screen, and a second touch operation imposed on a second preset area of a touch panel.

The execution module 12 is configured to perform zoom control on a display picture in a third preset area of the touch screen in response to determining that the first touch operation and the second touch operation meet a preset zoom condition.

In the device for controlling the display picture of the mobile terminal provided in this embodiment, the obtaining module obtains the first touch operation imposed on the first preset area of the touch screen, and the second touch operation imposed on the second preset area of the touch panel, and after determining the first touch operation and the second touch operation meet the preset zoom condition, the execution module performs the zoom control on the display picture in the third preset area of the touch screen. The above zoom control does not affect the user's current holding state of the mobile terminal, and the zoom control is performed according to the touch operations on the front and rear screens, avoiding the delay caused by the existing single-screen two-finger operation, and improving the user's operating experience.

Based on the above embodiments, optionally, the first touch operation includes a first click operation and a first sliding operation, and the second touch operation includes a second click operation and a second sliding operation.

Figure 11:
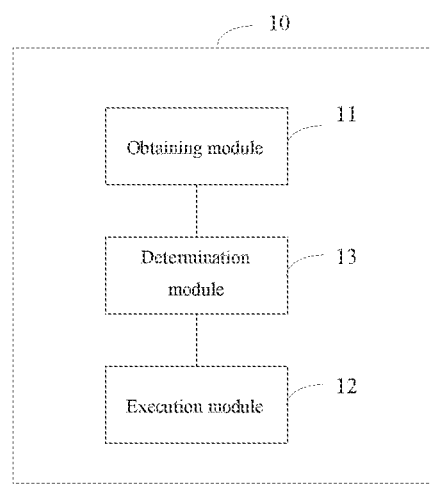
FIG. 11 is a schematic structural diagram illustrating a device for controlling a display picture of a mobile terminal according to another embodiment of the present disclosure.

FIG. 11 is a schematic structural diagram illustrating a device for controlling a display picture of a mobile terminal according to another embodiment of the present disclosure. Based on the device shown in FIG. 10, the control device 10 of this embodiment further includes a determination module 13, as shown in FIG. 11.

The obtaining module 11 is further configured to obtain touch point information about the first click operation and the second click operation, and sliding information about the first sliding operation and the second sliding operation.

The determination module 13 is configured to determine to enable a picture zoom function according to the touch point information and the sliding information.

The execution module 12 is further configured to perform the zoom control on the display picture in the third preset area of the touch screen according to the sliding information.

Optionally, the touch point information includes a trigger time and a touch point position; the sliding information includes a sliding direction. In this case, the determination module 13 is further configured to enable the picture zoom-in function if the followings are met: a time difference between a first trigger time of the first click operation and a second trigger time of the second click operation being less than a preset time difference; a distance between a first touch point position of the first click operation and a second touch point position of the second click operation being less than a first preset distance; and a sliding direction of the first sliding operation and a sliding direction of the second sliding operation being divergence directions.

Optionally, the touch point information includes a trigger time and a touch point position, and the sliding information includes a sliding direction. In this case, the determination module 13 is further configured to enable the picture zoom-out function if the followings are met: a time difference between a first trigger time of the first click operation and a second trigger time of the second click operation being less than a preset time difference; a distance between a first touch point position of the first click operation and a second touch point position of the second click operation being greater than or equal to a second preset distance; and a sliding direction of the first sliding operation and a sliding direction of the second sliding operation being convergence directions.

Optionally, the touch point information further includes a pressing force at the touch point. In this case, the determination module 13 is further configured to enable the picture zoom-in function if the followings are met: a time difference between a first trigger time of the first click operation and a second trigger time of the second click operation being less than a preset time difference; a distance between a first touch point position of the first click operation and a second touch point position of the second click operation being less than a first preset distance; a pressing force of the first click operation and a pressing force of the second click operation both being greater than a preset pressure value; and a sliding direction of the first sliding operation and a sliding direction of the second sliding operation being divergence directions.

Optionally, the touch point information further includes a pressing force at the touch point. In this case, the determination module 13 is further configured to enable the picture zoom-out function if the followings are met: a time difference between a first trigger time of the first click operation and a second trigger time of the second click operation being less than a preset time difference; a distance between a first touch point position of the first click operation and a second touch point position of the second click operation being greater than a second preset distance; a pressing force of the first click operation and a pressing force of the second click operation both being greater than a preset pressure value;

and a sliding direction of the first sliding operation and a sliding direction of the second sliding operation being convergence directions.

Optionally, the sliding information includes coordinates of a starting point and an ending point of sliding, and the execution module 12 is further configured to:

determine a first sliding distance according to coordinates of the ending point of the first sliding operation and coordinates of the ending point of the second sliding operation;

determine a zoom-in ratio according to the first sliding distance; and perform zoom-in control on the display picture in the third preset area of the touch screen according to the zoom-in ratio.

Optionally, the sliding information includes coordinates of a starting point and an ending point of sliding, and the execution module 12 is further configured to:

determine a second sliding distance according to coordinates of the starting point of the first sliding operation and coordinates of the starting point of the second sliding operation;

determine a zoom-out ratio according to the second sliding distance; and perform zoom-out control on the display picture in the third preset area of the touch screen according to the zoom-out ratio.

The device for controlling the display picture of the mobile terminal provided in any of the foregoing implementations is configured to execute the technical solution in any of the foregoing method embodiments, and its implementation principles and technical effects are similar, and are not repeated here.

Figure 12:
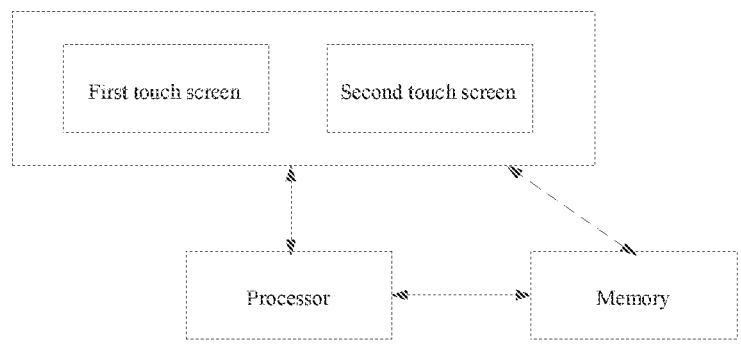
FIG. 12 is a schematic hardware structure diagram of an electronic device provided by an embodiment of the present disclosure.

FIG. 12 is a schematic hardware structural diagram of an electronic device provided by an embodiment of the present disclosure. As shown in FIG. 12, the electronic device includes at least: a touch screen, a touch panel, a processor and memory.

The memory is configured to store computer executable instructions.

The processor is configured to execute the computer executable instructions stored in the memory, so that the processor executes the method for controlling a display picture provided in any one of the foregoing method embodiments.

The present disclosure further provides a computer-readable storage medium storing a computer program, that, when executed by a processor, is used for implementing the method provided in any one of the foregoing method embodiments.

In the several embodiments provided in the present disclosure, it should be understood that the disclosed devices and methods may be implemented in other ways. For example, the device embodiments described above are merely illustrative. For example, the division of the units is only a kind of logical function division. In practice, other division manner may be used. For example, multiple units may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The modules described as separated parts may or may not be physically separated, and the parts displayed as modules may or may not be physical units, that is, the units may be located in one place, or may be distributed over multiple network units. Some or all of the modules may be selected according to actual needs to achieve the objectives of the solutions in the embodiments.

In addition, the functional modules in the embodiments of the present disclosure may be integrated in one processing unit, or the units may exist alone physically, or two or more units may be integrated in one unit. The units formed by the above modules can be implemented in the form of hardware, or in the form of hardware plus software functional units.

The above-mentioned integrated module implemented in the form of software function modules may also be stored in a computer-readable storage medium. The above software function modules are stored in a storage medium including a number of instructions such that a computer device (which may be a personal computer, a server, or a network device, etc.) or a processor performs part of steps of the method described in each of the embodiments of the present disclosure.

It should be understood that the above processor may be a central processing unit (CPU), and can also be general purpose processors, digital signal processors (DSPs), application specific integrated circuits (ASICs). The general purpose processor may be a microprocessor can also be any conventional processor, and so on. The steps of the method disclosed in combination with the present invention can be directly embodied as executed by a hardware processor, or executed by a combination of hardware and software modules in the processor.

The memory may include a high-speed RAM memory, or may also include a non-volatile storage NVM, such as at least one magnetic disk memory, and may also be a U disk, a mobile hard disk, a read-only memory, a magnetic disk, or an optical disk.

The above storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk or an optical disk. The storage medium may be any available medium that can be accessed by the general-purpose or special-purpose computer.

An exemplary storage medium is coupled to the processor so that the processor can read information from the storage medium and can write information to the storage medium. In addition, the storage medium may also be a component of the processor. The processor and the storage medium may be located in the application specific integrated circuits (ASIC for short). The processor and the storage medium may also exist as discrete components in the electronic device or the main control device.

Finally, it should be noted that the above embodiments are only used to illustrate the technical solutions of the present disclosure, not to limit them; although the present disclosure has been described in detail with reference to the foregoing embodiments, those of ordinary skill in the art should understand that they can still modify the technical solutions described in the foregoing embodiments, or equivalently replace some or all of the technical features; these modifications or replacements do not cause the essence of the corresponding technical solutions to deviate from the scope of the technical solutions of the embodiments of the present disclosure.

What is claimed is:

1. A method for controlling a display picture of a mobile terminal, wherein the mobile terminal comprises a touch screen and a touch panel, and the method comprises:

obtaining a first touch operation imposed on a first preset area of the touch screen, and a second touch operation imposed on a second preset area of the touch panel, wherein the first preset area of the touch screen is a detection area in a front touch screen of the mobile terminal for detecting user's touch operation, and the second preset area of the touch panel is a detection area in a rear touch screen of the mobile terminal for detecting user's touch operation; and performing zoom control on a display picture in a third preset area of the touch screen in response to determining that the first touch operation and the second touch operation meet a preset zoom condition;

wherein the first touch operation comprises a first click operation and a first sliding operation, and the second touch operation comprises a second click operation and a second sliding operation;

wherein the performing zoom control on a display picture in a third preset area of the touch screen in response to determining that the first touch operation and the second touch operation meet a preset zoom condition comprises:

obtaining touch point information about the first click operation and the second click operation, and sliding information about the first sliding operation and the second sliding operation, wherein the touch point information comprises a pressing force at a touch point;

determining to enable a picture zoom function according to the touch point information and the sliding information, comprising at least: determining to enable the picture zoom function in response to determining that the pressing force of the first click operation and the pressing force of the second click operation are both greater than a preset pressure value; and performing the zoom control on the display picture in the third preset area of the touch screen according to the sliding information.

2. The method according to claim 1, wherein the touch point information further comprises a trigger time and a touch point position, and the sliding information comprises a sliding direction, wherein the determining to enable a picture zoom function according to the touch point information and the sliding information comprises determining to enable a picture zoom-in function in response to determining that:

a time difference between a first trigger time of the first click operation and a second trigger time of the second click operation is less than a preset time difference;

a distance between a first touch point position of the first click operation and a second touch point position of the second click operation is less than a first preset distance; and a sliding direction of the first sliding operation and a sliding direction of the second sliding operation are divergence directions.

3. The method according to claim 1, wherein the touch point information further comprises a trigger time and a touch point position, and the sliding information comprises a sliding direction, wherein the determining to enable a picture zoom function according to the touch point information and the sliding information comprises determining to enable a picture zoom-out function in response to determining that:

a time difference between a first trigger time of the first click operation and a second trigger time of the second click operation is less than a preset time difference;

a distance between a first touch point position of the first click operation and a second touch point position of the second click operation is greater than or equal to a second preset distance; and a sliding direction of the first sliding operation and a sliding direction of the second sliding operation are convergence directions.

4. The method according to claim 2, wherein the determining to enable a picture zoom function according to the touch point information and the sliding information further comprises determining to enable the picture zoom-in function in response to determining that:

the time difference between the first trigger time of the first click operation and the second trigger time of the second click operation is less than the preset time difference;

the distance between the first touch point position of the first click operation and the second touch point position of the second click operation is less than the first preset distance;

the pressing force of the first click operation and the pressing force of the second click operation are both greater than the preset pressure value; and the sliding direction of the first sliding operation and the sliding direction of the second sliding operation are divergence directions.

5. The method according to claim 3, wherein the determining to enable a picture zoom function according to the touch point information and the sliding information further comprises determining to enable the picture zoom-out function in response to determining that:

the time difference between the first trigger time of the first click operation and the second trigger time of the second click operation is less than the preset time difference;

the distance between the first touch point position of the first click operation and the second touch point position of the second click operation is greater than the second preset distance;

the pressing force of the first click operation and the pressing force of the second click operation are both greater than the preset pressure value; and the sliding direction of the first sliding operation and the sliding direction of the second sliding operation are convergence directions.

6. The method according to claim 1, wherein the sliding information comprises coordinates of a starting point and an ending point of sliding, and the performing the zoom control on the display picture in the third preset area of the touch screen according to the sliding information comprises:

determining a first sliding distance according to coordinates of the ending point of the first sliding operation and coordinates of the ending point of the second sliding operation;

determining a zoom-in ratio according to the first sliding distance; and performing zoom-in control on the display picture in the third preset area of the touch screen according to the zoom-in ratio.

7. The method according to claim 1, wherein the sliding information comprises coordinates of a starting point and an ending point of sliding, and the performing the zoom control on the display picture in the third preset area of the touch screen according to the sliding information comprises:
   determining a second sliding distance according to coordinates of the starting point of the first sliding operation and coordinates of the starting point of the second sliding operation;
   determining a zoom-out ratio according to the second sliding distance; and
   performing zoom-out control on the display picture in the third preset area of the touch screen according to the zoom-out ratio.

8. An electronic device, comprising:
   a mobile terminal that comprises a touch screen and a touch panel;
   a processor; and
   a memory;
   wherein the memory is configured to store computer executable instructions, and the processor is configured to execute the computer executable instructions stored in the memory, to cause the processor to execute operations of:
   obtaining a first touch operation imposed on a first preset area of the touch screen, and a second touch operation imposed on a second preset area of the touch panel, wherein the first preset area of the touch screen is a detection area in a front touch screen of the mobile terminal for detecting user's touch operation, and the second preset area of the touch panel is a detection area in a rear touch screen of the mobile terminal for detecting user's touch operation; and
   performing zoom control on a display picture in a third preset area of the touch screen in response to determining that the first touch operation and the second touch operation meet a preset zoom condition;
   wherein the first touch operation comprises a first click operation and a first sliding operation, and the second touch operation comprises a second click operation and a second sliding operation;
   wherein the performing zoom control on a display picture in a third preset area of the touch screen in response to determining that the first touch operation and the second touch operation meet a preset zoom condition comprises:
      obtaining touch point information about the first click operation and the second click operation, and sliding information about the first sliding operation and the second sliding operation, wherein the touch point information comprises a pressing force at a touch point;
      determining to enable a picture zoom function according to the touch point information and the sliding information, comprising at least: determining to enable the picture zoom function in response to determining that the pressing force of the first click operation and the pressing force of the second click operation are both greater than a preset pressure value; and
      performing the zoom control on the display picture in the third preset area of the touch screen according to the sliding information.

9. A non-transitory computer-readable storage medium storing a computer program that, when executed by a processor, causes the processor to implement operations of:
   obtaining a first touch operation imposed on a first preset area of a touch screen of a mobile terminal, and a second touch operation imposed on a second preset area of a touch panel of the mobile terminal, wherein the first preset area of the touch screen is a detection area in a front touch screen of the mobile terminal for detecting user's touch operation, and the second preset area of the touch panel is a detection area in a rear touch screen of the mobile terminal for detecting user's touch operation; and
   performing zoom control on a display picture in a third preset area of the touch screen in response to determining that the first touch operation and the second touch operation meet a preset zoom condition;
   wherein the first touch operation comprises a first click operation and a first sliding operation, and the second touch operation comprises a second click operation and a second sliding operation;
   wherein the performing zoom control on a display picture in a third preset area of the touch screen in response to determining that the first touch operation and the second touch operation meet a preset zoom condition comprises:
      obtaining touch point information about the first click operation and the second click operation, and sliding information about the first sliding operation and the second sliding operation, wherein the touch point information comprises a pressing force at a touch point;
      determining to enable a picture zoom function according to the touch point information and the sliding information, comprising at least: determining to enable the picture zoom function in response to determining that the pressing force of the first click operation and the pressing force of the second click operation are both greater than a preset pressure value; and
      performing the zoom control on the display picture in the third preset area of the touch screen according to the sliding information.

10. The electronic device according to claim 8, wherein the touch point information further comprises a trigger time and a touch point position, and the sliding information comprises a sliding direction, wherein the determining to enable a picture zoom function according to the touch point information and the sliding information comprises determining to enable a picture zoom-in function in response to determining that:
   a time difference between a first trigger time of the first click operation and a second trigger time of the second click operation is less than a preset time difference;
   a distance between a first touch point position of the first click operation and a second touch point position of the second click operation is less than a first preset distance; and
   a sliding direction of the first sliding operation and a sliding direction of the second sliding operation are divergence directions.

11. The electronic device according to claim 8, wherein the touch point information further comprises a trigger time and a touch point position, and the sliding information comprises a sliding direction, wherein the determining to enable a picture zoom function according to the touch point information and the sliding information comprises determining to enable a picture zoom-out function in response to determining that:
   a time difference between a first trigger time of the first click operation and a second trigger time of the second click operation is less than a preset time difference;

a distance between a first touch point position of the first click operation and a second touch point position of the second click operation is greater than or equal to a second preset distance; and a sliding direction of the first sliding operation and a sliding direction of the second sliding operation are convergence directions.

12. The electronic device according to claim 10, wherein the determining to enable a picture zoom function according to the touch point information and the sliding information comprises determining to enable the picture zoom-in function in response to determining that:

the time difference between the first trigger time of the first click operation and the second trigger time of the second click operation is less than the preset time difference;

the distance between the first touch point position of the first click operation and the second touch point position of the second click operation is less than the first preset distance;

the pressing force of the first click operation and the pressing force of the second click operation are both greater than the preset pressure value; and the sliding direction of the first sliding operation and the sliding direction of the second sliding operation are divergence directions.

13. The electronic device according to claim 11, wherein the determining to enable a picture zoom function according to the touch point information and the sliding information comprises determining to enable the picture zoom-out function in response to determining that:

the time difference between the first trigger time of the first click operation and the second trigger time of the second click operation is less than the preset time difference;

the distance between the first touch point position of the first click operation and the second touch point position of the second click operation is greater than the second preset distance;

the pressing force of the first click operation and the pressing force of the second click operation are both greater than the preset pressure value; and the sliding direction of the first sliding operation and the sliding direction of the second sliding operation are convergence directions.

14. The electronic device according to claim 8, wherein the sliding information comprises coordinates of a starting point and an ending point of sliding, and the performing the zoom control on the display picture in the third preset area of the touch screen according to the sliding information comprises:

determining a first sliding distance according to coordinates of the ending point of the first sliding operation and coordinates of the ending point of the second sliding operation;

determining a zoom-in ratio according to the first sliding distance; and performing zoom-in control on the display picture in the third preset area of the touch screen according to the zoom-in ratio.

15. The electronic device according to claim 8, wherein the sliding information comprises coordinates of a starting point and an ending point of sliding, and the performing the zoom control on the display picture in the third preset area of the touch screen according to the sliding information comprises:

determining a second sliding distance according to coordinates of the starting point of the first sliding operation and coordinates of the starting point of the second sliding operation;

determining a zoom-out ratio according to the second sliding distance; and performing zoom-out control on the display picture in the third preset area of the touch screen according to the zoom-out ratio.

16. The storage medium according to claim 9, wherein the touch point information further comprises a trigger time and a touch point position, and the sliding information comprises a sliding direction, wherein the determining to enable a picture zoom function according to the touch point information and the sliding information comprises determining to enable a picture zoom-in function in response to determining that:

a time difference between a first trigger time of the first click operation and a second trigger time of the second click operation is less than a preset time difference;

a distance between a first touch point position of the first click operation and a second touch point position of the second click operation is less than a first preset distance; and a sliding direction of the first sliding operation and a sliding direction of the second sliding operation are divergence directions.

17. The storage medium according to claim 9, wherein the touch point information further comprises a trigger time and a touch point position, and the sliding information comprises a sliding direction, wherein the determining to enable a picture zoom function according to the touch point information and the sliding information comprises determining to enable a picture zoom-out function in response to determining that:

a time difference between a first trigger time of the first click operation and a second trigger time of the second click operation is less than a preset time difference;

a distance between a first touch point position of the first click operation and a second touch point position of the second click operation is greater than or equal to a second preset distance; and a sliding direction of the first sliding operation and a sliding direction of the second sliding operation are convergence directions.

18. The method according to claim 16, wherein the determining to enable a picture zoom function according to the touch point information and the sliding information further comprises determining to enable the picture zoom-in function in response to determining that:

the time difference between the first trigger time of the first click operation and the second trigger time of the second click operation is less than the preset time difference;

the distance between the first touch point position of the first click operation and the second touch point position of the second click operation is less than the first preset distance;

the pressing force of the first click operation and the pressing force of the second click operation are both greater than the preset pressure value; and the sliding direction of the first sliding operation and the sliding direction of the second sliding operation are divergence directions.

19. The method according to claim 17, wherein the determining to enable a picture zoom function according to the touch point information and the sliding information further comprises determining to enable the picture zoom-out function in response to determining that:
- the time difference between the first trigger time of the first click operation and the second trigger time of the second click operation is less than the preset time difference;
- the distance between the first touch point position of the first click operation and the second touch point position of the second click operation is greater than the second preset distance;
- the pressing force of the first click operation and the pressing force of the second click operation are both greater than the preset pressure value; and
- the sliding direction of the first sliding operation and the sliding direction of the second sliding operation are convergence directions.

20. The method according to claim 9, wherein the sliding information comprises coordinates of a starting point and an ending point of sliding, and the performing the zoom control on the display picture in the third preset area of the touch screen according to the sliding information comprises:
- determining a first sliding distance according to coordinates of the ending point of the first sliding operation and coordinates of the ending point of the second sliding operation;
- determining a zoom-in ratio according to the first sliding distance; and
- performing zoom-in control on the display picture in the third preset area of the touch screen according to the zoom-in ratio.

* * * * *